United States Patent
Huang et al.

(10) Patent No.: US 8,331,070 B2
(45) Date of Patent: Dec. 11, 2012

(54) POWER SUPPLY WITH OPEN-LOOP PROTECTION

(75) Inventors: Wei-Hsuan Huang, Taoyuan County (TW); Meng-Jen Tsai, Hsinchu (TW); Chien-Yuan Lin, Taipei County (TW); Chuan-Chang Li, Hsinchu County (TW)

(73) Assignee: System General Corp., Taipei Hsien (TW)

( * ) Notice: Subject to any disclaimer, the term of this patent is extended or adjusted under 35 U.S.C. 154(b) by 349 days.

(21) Appl. No.: 12/821,511

(22) Filed: Jun. 23, 2010

(65) Prior Publication Data

US 2011/0211281 A1    Sep. 1, 2011

(30) Foreign Application Priority Data

Mar. 1, 2010   (CN) .......................... 2010 1 0117354

(51) Int. Cl.
*H02H 3/24* (2006.01)
(52) U.S. Cl. ............................................. 361/92
(58) Field of Classification Search .................... 361/92
See application file for complete search history.

(56) References Cited

U.S. PATENT DOCUMENTS

| | | | | |
|---|---|---|---|---|
| 4,010,381 A * | 3/1977 | Fickenscher et al. | ............ | 307/66 |
| 7,257,008 B2 * | 8/2007 | Yang et al. | .................. | 363/21.12 |
| 7,310,251 B2 * | 12/2007 | Yang et al. | .................. | 363/56.09 |
| 7,760,478 B2 * | 7/2010 | Yang et al. | .................... | 361/93.1 |
| 2005/0105311 A1 * | 5/2005 | Soldano | .......................... | 363/89 |
| 2009/0141521 A1 * | 6/2009 | Yang | .............................. | 363/49 |
| 2009/0213623 A1 * | 8/2009 | Yang | .............................. | 363/49 |
| 2012/0106205 A1 * | 5/2012 | Tsai et al. | .................. | 363/21.01 |

* cited by examiner

*Primary Examiner* — Ronald W Leja
(74) *Attorney, Agent, or Firm* — Rosenberg, Klein & Lee

(57) ABSTRACT

A power supply with an open-loop protection according to the present invention comprises a transformer, a switch, a signal generation circuit, a feedback detection circuit, a brown-out detection circuit, and a delay circuit. The transformer receives an input voltage. The switch is coupled to the transformer for switching the transformer. The signal generation circuit generates a switching signal to control the switch. The feedback detection circuit generates a pull-high signal in response to a feedback signal of the power supply. The brown-out detection circuit generates a delay signal in response to the pull-high signal and the input voltage. The delay circuit counts a delay time in response to the delay signal for generating a disabling signal coupled to the signal generation circuit to latch the switching signal. The brown-out detection circuit is utilized to detect whether the input voltage is in the brown-out condition for determining whether the open-loop protection is executed.

11 Claims, 5 Drawing Sheets

POWER SUPPLY WITH OPEN-LOOP PROTECTION

BACKGROUND OF THE INVENTION

1. Field of Invention

The present invention relates to a power supply, and more particularly, the present invention relates to a power supply with open-loop protection.

2. Description of Related Art

In general, power supplies have been widely used to provide stable voltage and current. Based on the restriction of the safety provision, power supply must provide an Open-loop protection and a brown-out protection for preventing the power supply itself and the circuits of the load terminal from the influence. FIG. 1 shows a circuit diagram of a traditional power supply with the open-loop protection. The traditional power supply comprises a transformer $T_1$, a driving circuit 14, a signal generation circuit 10, an oscillator 12, a power switch $Q_1$, a feedback detection circuit 16 and a delay circuit 18.

Referring to FIG. 1, the transformer $T_1$ has a primary winding $N_P$ and a secondary winding $N_S$ for the energy storage and the power conversion. The transformer $T_1$ is coupled to an input voltage $V_{IN}$ of the power supply. The energy stored in primary winding $N_P$ of the transformer $T_1$ is converted to the secondary winding $N_S$ while the transformer $T_1$ is switched by the power switch $Q_1$. The energy converted to the secondary winding $N_S$ is regulated by an output rectifier $D_O$ and an output capacitor $C_O$ to generate an output voltage $V_O$. The current sense device $R_S$ is coupled to the power switch $Q_1$ in series. The current sense device $R_S$ generates a current signal $V_{CS}$ in response to a primary switching current $I_P$ from the transformer $T_1$. Otherwise, a feedback signal $V_{FB}$ is provided from the output voltage $V_O$ of the power supply to the driving circuit 14 and the feedback detection circuit 16 through a feedback manner.

The driving circuit 14 consists of a logic circuit 144, a power limit comparator 146 and a pulse width modulation (PWM) comparator 148. The driving circuit 14 generates a reset signal CLR to disable the switching signal $V_{PWM}$ in response to the current signal $V_{CS}$, a power limit signal $V_{LMT}$ and the feedback signal $V_{FB}$. An input terminal of the power limit comparator 146 and an input terminal of the PWM comparator 148 both are coupled to the current sense device $R_S$ for receiving the current signal $V_{CS}$. Another input terminal of the power limit comparator 146 receives the power limit signal $V_{LMT}$, and another input terminal of the PWM comparator 148 receives the feedback signal $V_{FB}$.

An output terminal of the power comparator 146 generates an over current signal OC that is in a low level when the current signal $V_{CS}$ is higher than the power limit signal $V_{LMT}$. Furthermore, An output terminal of the PWM comparator 148 generates a feedback control signal CNTR that is in the low level when the current signal $V_{CS}$ is higher than the feedback signal $V_{FB}$. Two input terminals of the logic circuit 144 are coupled to the output terminals of the power comparator 146 and the PWM comparator 148 respectively. Therefore, an output terminal of the logic circuit 144 generates the reset signal CLR that is in the low level for disabling the switching signal $V_{PWM}$ in response to the over current signal OC and/or the feedback control signal CNTR. In other words, the driving circuit 14 determines the logic level of the reset signal CLR in response to the logic level of the feedback control signal CNTR or the over current signal OC.

The signal generation circuit 10 comprises a logic circuit 101, a flip-flop 103 and a logic circuit 105. The logic circuit 101 is an inverter. An input terminal of the logic circuit 101 is coupled to the oscillator 12 for receiving a pulse signal PLS outputted from the oscillator 12. An output terminal of the logic circuit 101 is coupled to a clock input terminal CK of the flip-flop 103 for driving the flip-flop 103. An input terminal D of the flip-flop 103 is coupled to an output terminal of the delay circuit 18. An output terminal Q of the flip-flop 103 is coupled to an input terminal of the logic circuit 105. Another input terminal of the logic circuit 105 receives the pulse signal PLS via the logic circuit 101. An output terminal of the logic circuit 105 generates the switching signal $V_{PWM}$. The logic circuit 105 is an AND gate. A reset input terminal R of the flip-flop 103 is coupled to the output terminal of the driving circuit 14 for receiving the reset signal CLR.

The signal generation circuit 10 is coupled to the output terminals of the oscillator 12 and the driving circuit 14. The signal generation circuit 10 generates the switching signal $V_{PWM}$ in response to the pulse signal PLS outputted from the oscillator 12. The switching signal $V_{PWM}$ controls the switch of the power switch $Q_1$. The signal generation circuit 10 periodically adjusts the pulse width of the switching signal $V_{PWM}$ in response to the reset signal CLR outputted from the driving circuit 14 for regulating the output voltage $V_O$ of the power supply in stable and limiting the output power.

Referring to FIG. 1, two input terminals of the feedback detection circuit 16 receives the feedback signal $V_{FB}$ and a threshold signal $V_{TH}$ respectively for generating a pull-high signal $S_{PH}$. The feedback signal $V_{FB}$ is lower than the threshold signal $V_{TH}$ when the power supply is in a normal operation condition. In the meanwhile, an output terminal of the feedback detection circuit 16 generates the pull-high signal $S_{PH}$ that is in the low level. The delay circuit 18 doesn't count and outputs a disabling signal $S_{OFF}$ that is in a high level to the signal generation circuit 10 when the delay circuit 18 receives the pull-high signal $S_{PH}$ that is in the low level. The signal generation circuit 10 doesn't latch the switching signal $V_{PWM}$ when the signal generation circuit 10 receives the disabling signal $S_{OFF}$ that is in the high level.

In contrast, the level of the feedback signal $V_{FB}$ will be pulled to high to reach a supply voltage $V_{CC}$ via a pull-high resister $R_{PH}$ when an open-loop condition is occurred at the output terminal of the power supply. The output terminal of the feedback detection circuit 16 generates the pull-high signal $S_{PH}$ that is in the high level when the level of the feedback signal $V_{FB}$ is pulled to high to be higher than the threshold signal $V_{TH}$. The delay circuit 18 starts to count in response to the pull-high signal $S_{PH}$ that is in the high level, and generates the disabling signal $S_{OFF}$ that is in the low level after a delay time. The signal generation circuit 10 will latch the switching signal $V_{PWM}$ in response to the disabling signal $S_{OFF}$ that is in the low level. Therefore, when the level of the feedback signal $V_{FB}$ is pulled to high, the feedback detection circuit 16 and the delay circuit 18 controls the signal generation circuit 10 to latch the switching signal $V_{PWM}$ for the open-loop protection.

Besides, the power supply has a brown-out protection circuit (not shown in FIG. 1). The brown-out protection circuit counts a delay time when the input voltage $V_{IN}$ of the power supply is in a brown-out condition. Then, the brown-out protection circuit latches the switching signal $V_{PWM}$ for the brown-out protection after the brown-out protection circuit counts the delay time completely. The delay time required for the brown-out protection is longer than the delay time required for the open-loop protection. Actually, if the occurring time of brown-out condition is shorter than the delay time of the brown-out protection, the brown-out protection is not needed to be executed. It is to say, latching the switching signal $V_{PWM}$ is not necessary. However, once the input voltage $V_{IN}$ is in the brown-out condition the level of the feedback signal $V_{FB}$ is pulled to high to reach the supply voltage $V_{CC}$ via the pull-high resister $R_{PH}$. Further, the delay time of the open-loop protection is shorter than the delay time of the brown-out protection. Accordingly, the brown-out protection is not needed to be executed when the brown-out condition is occurred and the occurring time of the brown-out condition is shorter than the delay time of the brown-out protection, but the open-loop protection is executed firstly to latch the switching signal $V_{PWM}$ before the brown-out protection is executed. Therefore, it causes a miscarriage of latching the switching signal $V_{PWM}$. For the power supply design, it has become a major concern how the power supply distinguishes accurately between the open-loop protection and the brown-out protection when the delay time of the brown-out protection can't be shortened.

SUMMARY OF THE INVENTION

It is an objective of the present invention to provide a power supply with open-loop protection. A brown-out detection circuit of the power supply with open-loop protection detects whether the input voltage is in a brown-out condition for determining whether the open-loop protection is executed when the feedback signal is pulled to high.

A power supply with the open-loop protection is developed according to the present invention. The power supply includes a transformer, a switch, a signal generation circuit, a feedback detection circuit, a brown-out detection circuit and a delay circuit. The transformer receives an input voltage. The switch is coupled to the transformer for switching the transformer. The signal generation circuit generates a switching signal for controlling the switch to switch. The feedback detection circuit generates a pull-high signal in response to a feedback signal of the power supply. The brown-out detection circuit generates a delay signal in response to the pull-high signal and the input voltage. The delay circuit generates a disabling signal coupled to the signal generation circuit for latching the switching signal after a delay time is counted by the delay circuit in response to the delay signal. The brown-out detection circuit is used to detect whether the input voltage is in the brown-out condition for determining whether the open-loop protection is executed when the feedback signal is pulled to high level.

BRIEF DESCRIPTION OF ACCOMPANIED DRAWINGS

The accompanying drawings are included to provide a further understanding of the present invention, and are incorporated in and constitute a part of this specification. The drawings illustrate embodiments of the present invention and, together with the description, serve to explain the principles of the present invention. In the drawings, FIG. 1 shows a circuit diagram of a traditional power supply with open-loop protection.

DETAILED DESCRIPTION OF PREFERRED EMBODIMENTS

Figure 1:
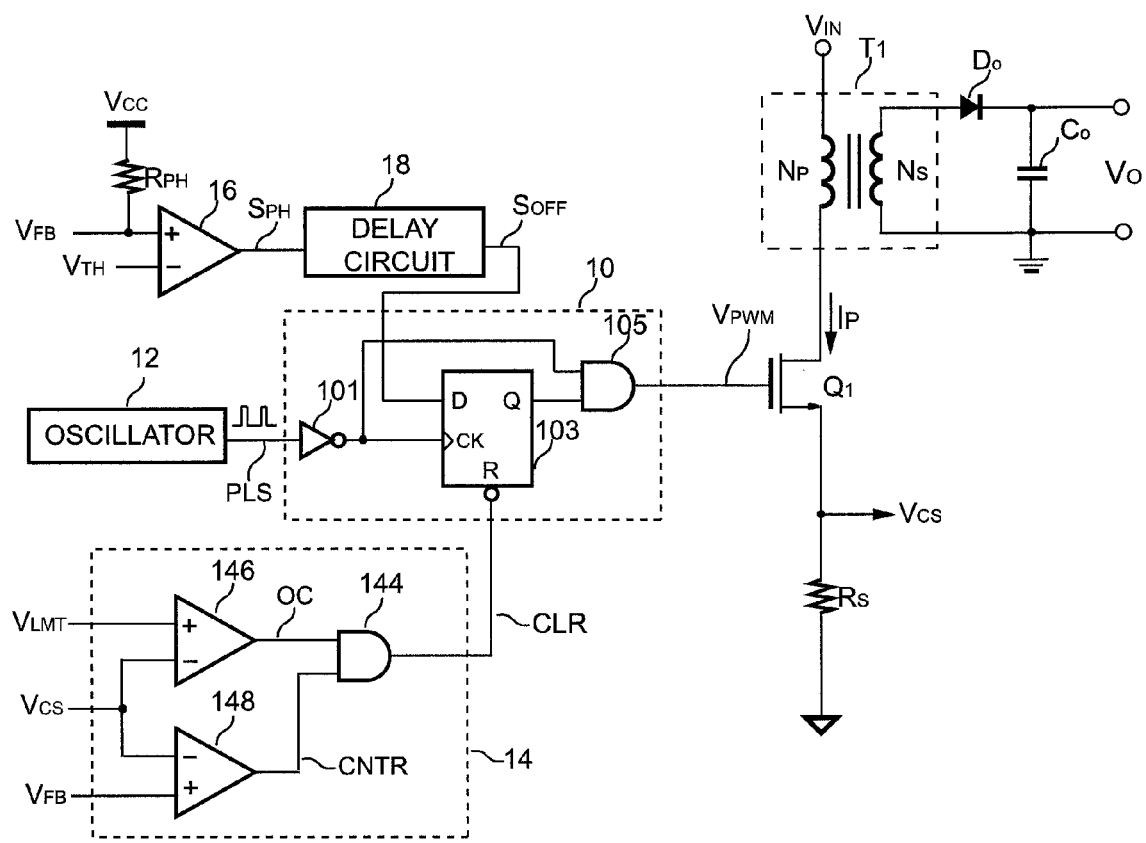
Figure 2:
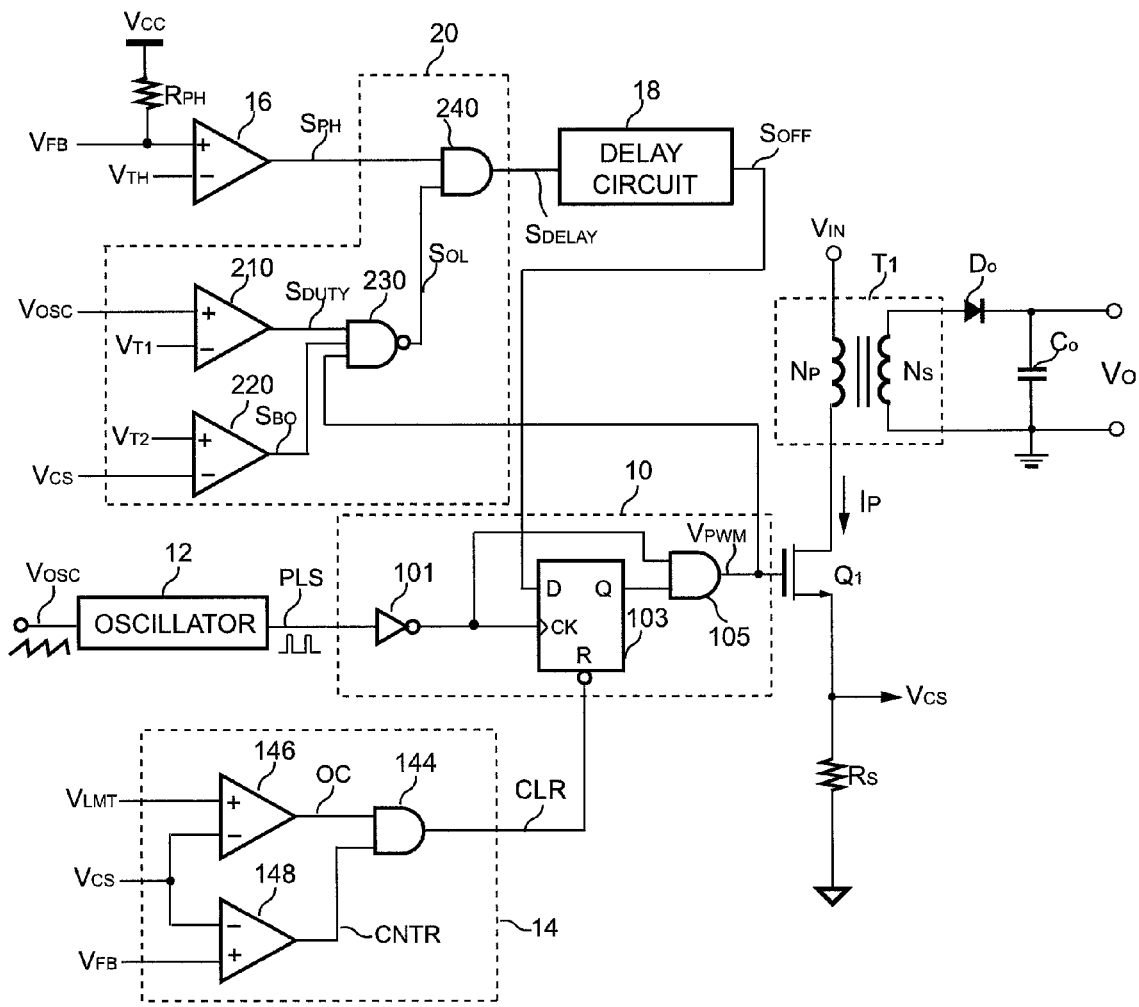
FIG. 2 shows a circuit diagram of a preferred embodiment of a power supply with open-loop protection according to the present invention.

FIG. 2 shows a circuit diagram of a preferred embodiment of a power supply with open-loop protection according to the present invention. The power supply adds a brown-out detection circuit 20 according to the present invention, other than the circuits of the prior art are shown in FIG. 1. The brown-out detection circuit 20 includes a duty comparator 210, an input comparator 220, a first logic circuit 230 and a second logic circuit 240. The brown-out detection circuit 20 is utilized for detecting an input voltage $V_{IN}$ of the power supply and generating a brown-out signal $S_{OL}$. The first logic circuit 230 can be a NAND gate in accordance with one embodiment of the present invention. The second logic circuit 240 can be an AND gate in accordance with one embodiment of the present invention.

A positive terminal of the duty comparator 210 is coupled to an oscillator 12 for receiving a saw signal $V_{OSC}$. A negative terminal of the duty comparator 210 receives a first signal $V_{T1}$. A duty signal $S_{DUTY}$ is in the low level that is generated from an output terminal of the duty comparator 210 when the saw signal $V_{OSC}$ is lower than the first signal $V_{T1}$. Wherein a period that the duty signal $S_{DUTY}$ is kept in the low level is called as an off-time period. The output terminal of the duty comparator 210 generates the duty signal $S_{DUTY}$ that is in the high level when the saw signal $V_{OSC}$ is higher than the first signal $V_{T1}$. Wherein a period that the duty signal $S_{DUTY}$ is kept in the high level is called as an on-time period. It is important that the switching period of the saw signal $V_{OSC}$ is a constant period, and the first signal $V_{T1}$ is a predetermined constant value. Therefore, the pulse width of the duty signal $S_{DUTY}$ is a constant pulse width.

A positive terminal of the input comparator 220 receives a second signal $V_{T2}$. A negative terminal of the input comparator 220 is coupled to the current sense device $R_S$ (shown in FIG. 1) for receiving the current signal $V_{CS}$. An output terminal of the input comparator 220 generates an input signal $S_{BO}$ that is in the high level when the current signal $V_{CS}$ is lower than the second signal $V_{T2}$. Wherein the second signal $V_{T2}$ is a predetermined constant value, and the current signal $V_{CS}$ is correlated to the primary switching current $I_P$. Therefore, the peak value of the current signal $V_{CS}$ is correlated to the level of the input voltage $V_{IN}$. It is to say, the peak of the current signal $V_{CS}$ is higher while the level of the input voltage $V_{IN}$ is higher, and the peak of the current signal $V_{CS}$ is lower while the level of the input voltage $V_{IN}$ is lower. Accordingly, when the current signal $V_{CS}$ is lower than the second signal $V_{T2}$ and the output terminal of the input comparator 220 generates the input signal $S_{BO}$ that is in high level, the input voltage $V_{IN}$ of the power supply is lower than the second signal $V_{T2}$. In other words, the input voltage $V_{IN}$ is in a brown-out condition. Therefore, the brown-out detection circuit 20 can be used to detect the input voltage $V_{IN}$.

An input terminal of the first logic circuit 230 is coupled to the output terminals of the duty comparator 210, the input comparator 220 and the signal generation circuit 10. The first logic circuit 230 generates the brown-out signal $S_{OL}$ in response to the duty signal $S_{DUTY}$, the input signal $S_{BO}$ and the switching signal $V_{PWM}$. An input terminal of the second logic circuit 240 is coupled to the output terminals of a feedback detection circuit 16 and the first logic circuit 230. The second logic circuit 240 generates a delay signal $S_{DELAY}$ in response to a pull-high signal $S_{PH}$ and the brown-out signal $S_{OL}$. A delay circuit 18 determines whether counting and generating a disabling signal $S_{OFF}$ in response to the level of the delay signal $S_{DELAY}$. In other words, the delay circuit 18 counts the delay time in response to the levels of the pull-high signal $S_{PH}$ and the brown-out signal $S_{OL}$, and then generates the disabling signal $S_{OFF}$ after counting the delay time completely. The signal generation circuit 10 determines whether latching the switching signal $V_{PWM}$ in response to the level of the disabling signal $S_{OFF}$. The signal generation circuit 10 will latch the switching signal $V_{PWM}$ in response to the disabling signal $S_{OFF}$ that is in the low level when the disabling signal $S_{OFF}$ that is in the low level is generated.

Figure 3:
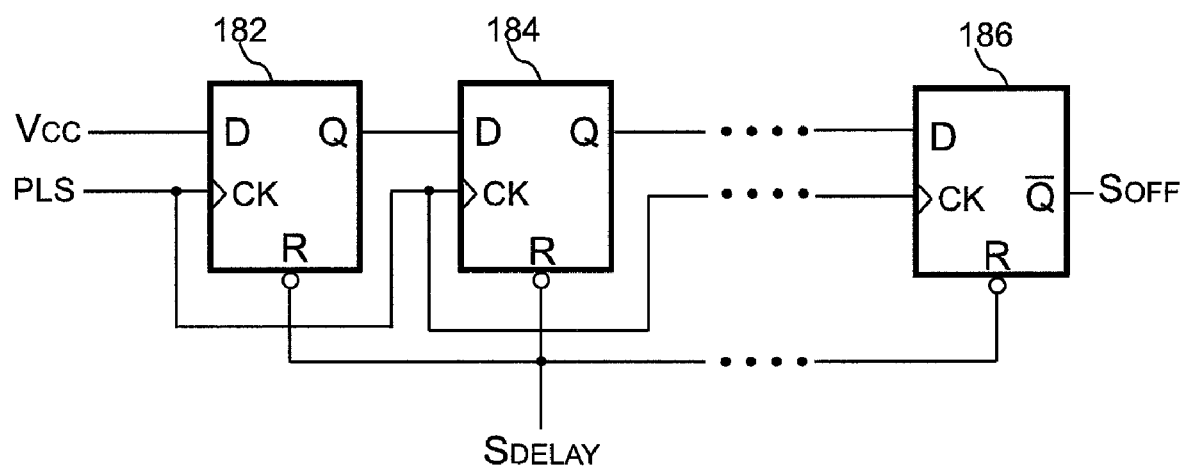
FIG. 3 shows a circuit diagram of a preferred embodiment of a delay circuit according to the present invention.

FIG. 3 shows a circuit diagram of a preferred embodiment of the delay circuit 18 according to the present invention. The delay circuit 18 includes flip-flops 182, 184, . . . , 186. The clock input terminals of the flip-flops 182, 184, . . . , 186 are coupled to the oscillator 12 (as shown in FIG. 2) for receiving the time base of the pulse signal PLS to count. An input terminal D of the flip-flop 182 receives the supply voltage $V_{CC}$. Input terminals D of the flip-flops 184 and 186 are coupled to an output terminal Q of the previously flip-flop respectively. For example, the input terminal D of the flip-flop 184 is coupled to the output terminal Q of the flip-flop 182. An inverse output terminal /Q of the flip-flop 186 generates the disabling signal $S_{OFF}$. Furthermore, reset terminals of the flip-flops 182, 184, . . . , 186 are coupled to the output terminal of the second logic circuit 240 (as shown in FIG. 2) together for receiving the delay signal $S_{DELAY}$.

Referring to FIG. 2, the flip-flops 182, 184, . . . , 186 are reset to disable the delay circuit 18 after the delay circuit 18 receives the delay signal $S_{DELAY}$ that is in the low level. Therefore, the delay circuit 18 disables to count. The inverse output terminal /Q of the last flip-flop 186 outputs the disabling signal $S_{DFF}$ that is in the high level The disabling signal $S_{OFF}$ is coupled to the signal generation circuit 10. In contrast, the flip-flops 182, 184, . . . , 186 are not reset after the delay circuit 18 receives the delay signal $S_{DELAY}$ that is in the high level. In the meanwhile, the delay circuit 18 starts to count. The inverse output terminal /Q of the last flip-flop 186 outputs the disabling signal $S_{OFF}$ that is in the low level to the signal generation circuit 10 after the delay circuit 18 has counted a delay time $T_D$. The signal generation circuit 10 latches the switching signal $V_{PWM}$ in response to the disabling signal $S_{OFF}$ that is in the low level.

The feedback signal $V_{FB}$ is lower than the threshold signal $V_{TH}$ (as shown in FIG. 2) when the power supply is in the normal operation. In the meanwhile, the output terminal of the feedback detection circuit 16 generates the pull-high signal $S_{PH}$ that is in the low level. The second logic circuit 240 generates the delay signal $S_{DELAY}$ directly that is in the low level after the second logic circuit 240 receives the pull-high signal $S_{PH}$ that is in the low level, no matter that the level of the brown-out signal $S_{OL}$ is high or low. The flip-flops 182, 184, . . . , 186 (as shown in FIG. 3) are reset after the delay circuit 18 receives the delay signal $S_{DELAY}$ that is in the low level, so that the delay circuit 18 doesn't count and generates the disabling signal $S_{OFF}$ that is in the high level to the signal generation circuit 10. Therefore, the signal generation circuit 10 doesn't latch the switching signal $V_{PWM}$ and the power supply when the power supply is in the normal operation.

Otherwise, the level of the feedback signal $V_{FB}$ is pulled to high and the feedback detection circuit 16 generates the pull-high signal $S_{PH}$ that is in the high level when the open-loop condition or the brown-out condition is occurred. The feedback detection circuit 16 generates the pull-high signal $S_{PH}$ that is in the high level when the open-loop condition is occurred in the output terminal of the power supply. The brown-out detection circuit 20 judges whether the input voltage $V_{IN}$ is in the brown-out condition in response to the switching signal $V_{PWM}$, the saw signal $V_{OSC}$ and the current signal $V_{CS}$. The current signal $V_{CS}$ being higher than the second signal $V_{T2}$ indicates that the input voltage $V_{IN}$ of the power supply is not in the brown-out condition (in a normal condition).

Figure 4A:
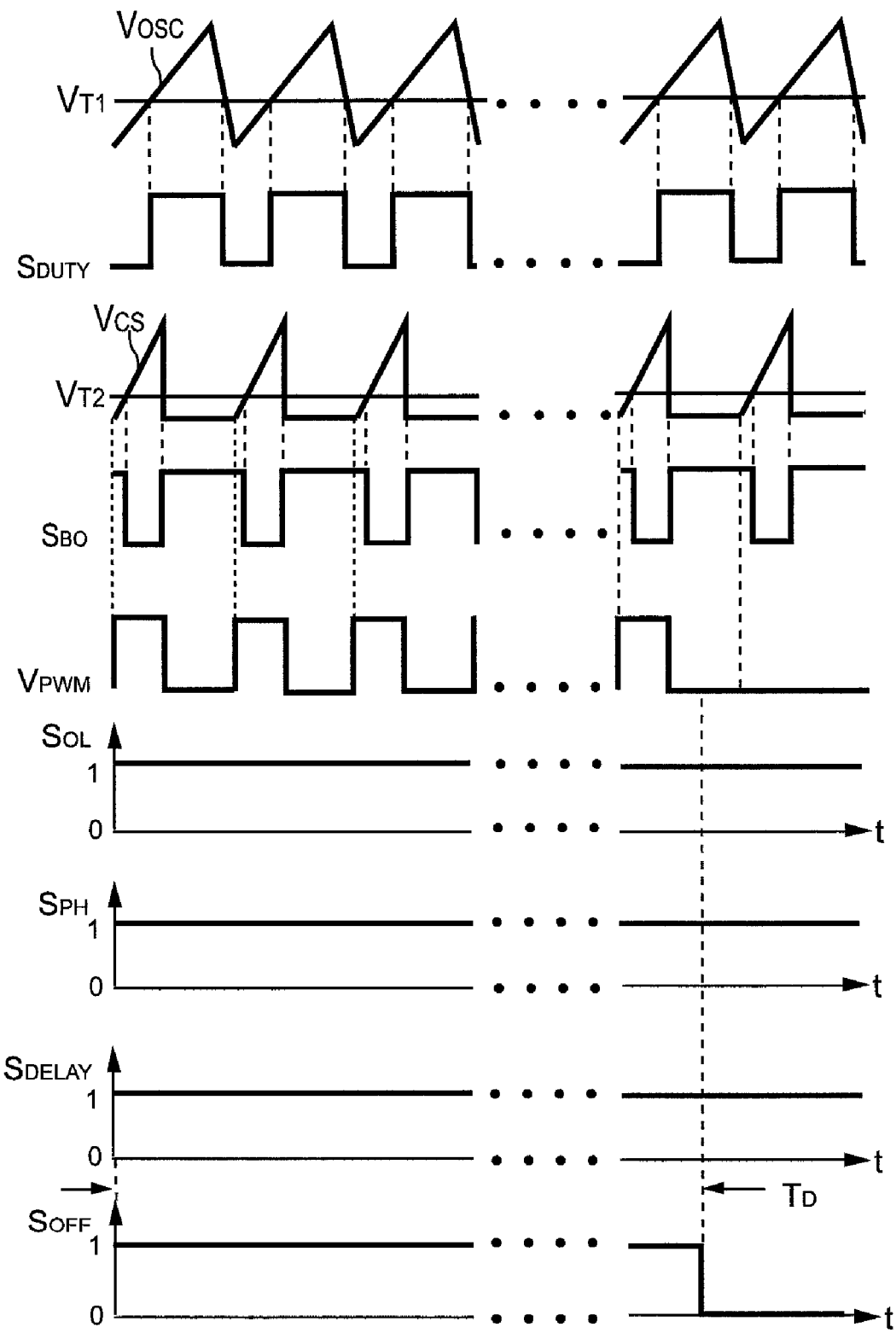
FIGS. 4A and 4B show the waveform of the power supply with open-loop protection according to the present invention.
Figure 4B:
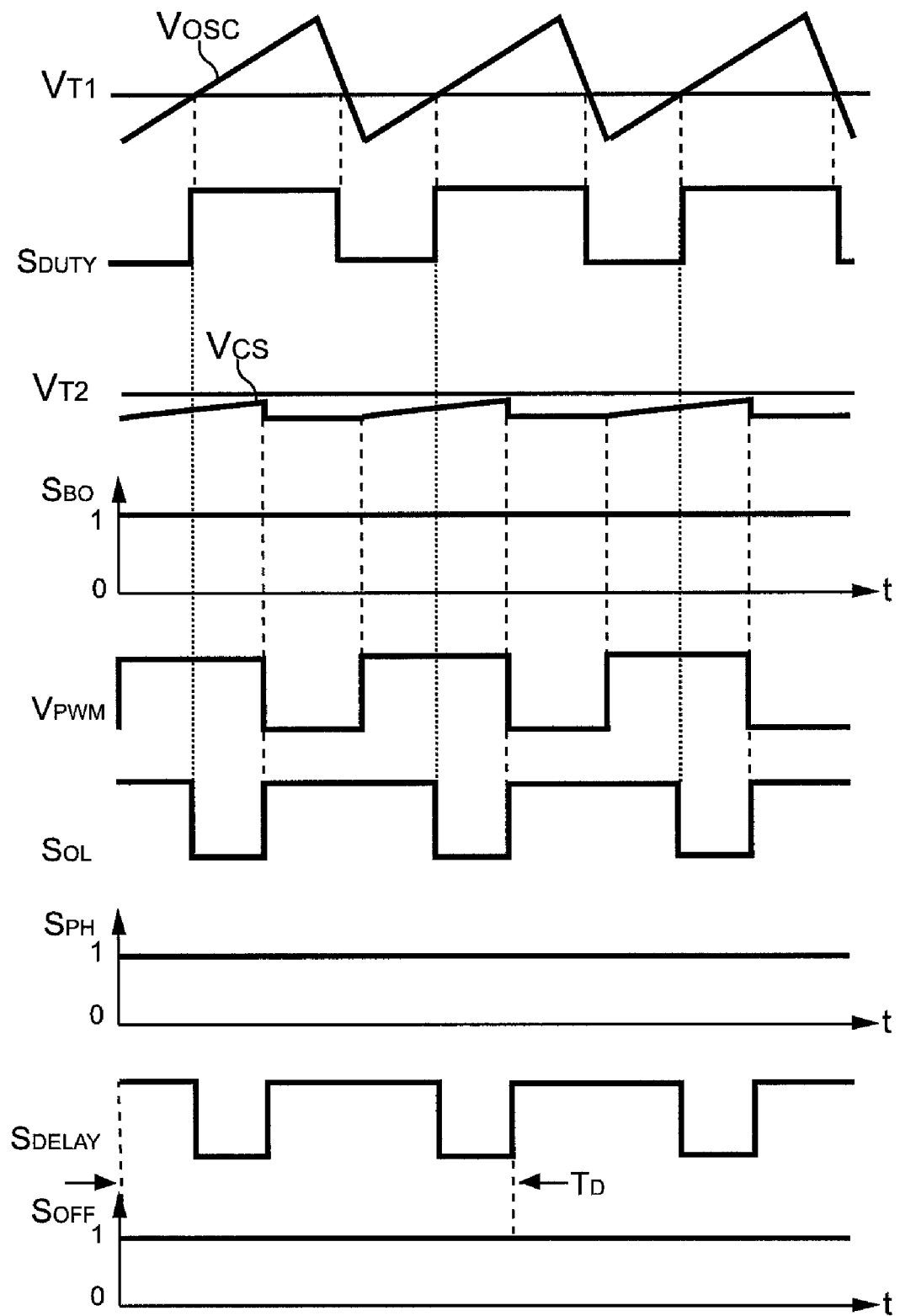

FIG. 4A and FIG. 4B show the waveforms of the power supply with the open-loop protection according to the present invention. Referring to FIG. 2 and FIG. 4A, as shown in FIG. 4A, the output terminal of the first logic circuit 230 generates the brown-out signal $S_{OL}$ that is in the high level when one of the duty signal $S_{DUTY}$, the input signal $S_{BO}$ and the switching signal $V_{PWM}$ is in the low level. In other words, when the saw signal $V_{OSC}$ is lower than the first signal $V_{T1}$, the current signal $V_{CS}$ is higher than the second signal $V_{T2}$ or the switching signal $V_{PWM}$ is in the low level, the brown-out detection circuit 20 enables the brown-out signal $S_{OL}$. Through designing specifically the first signal $V_{T1}$ and second signal $V_{T2}$, the brown-out signal $S_{OL}$ kept in the high level continuously is achieved in a switching period. In other words, when the input voltage $V_{IN}$ is not in the brown-out condition, the brown-out signal $S_{OL}$ is kept in the high level, and then the brown-out signal $S_{OL}$ is mated with the pull-high signal $S_{PH}$ that is in the high level for driving the brown-out detection circuit 20 generates the delay signal $S_{DELAY}$ that is in the high level continuously. Accordingly, it is judged that the open-loop is occurred in the power supply according to the present invention. Then, the delay circuit 18 starts to count after the delay circuit 18 receives the delay signal $S_{DELAY}$ that is in the high level. After the delay circuit 18 counts the delay time $T_D$, the delay circuit 18 generates the disabling signal $S_{OFF}$ that is in the low level. The disabling signal $S_{OFF}$ being in the low level is coupled to the signal generation circuit 10 for latching the switching signal $V_{PWM}$.

Besides, as shown in FIG. 4B, the brown-out detection circuit 20 judges whether the input voltage $V_{IN}$ is in the brown-out condition in response to the switching signal $V_{PWM}$, the saw signal $V_{OSC}$ and the current signal $V_{CS}$ when the open-loop condition is not occurred and the input voltage $V_{IN}$ is more low. The current signal $V_{CS}$ being lower than the second signal $V_{T2}$ indicates that the input voltage $V_{IN}$ is in the brown-out condition. The input signal $S_{BO}$ is kept in the high level when the current signal $V_{CS}$ is lower than the second signal $V_{T2}$. The output terminal of the first logic circuit 230 generates the brown-out signal $S_{OL}$ that is in the high level when one of the duty signal $S_{DUTY}$, the input signal $S_{BO}$, or the switching signal $V_{PWM}$ is in the low level. The output terminal of the first logic circuit 230 generates the brown-out signal $S_{OL}$ that is in the low level when the duty signal $S_{DUTY}$, the input signal $S_{BO}$, and the switching signal $V_{PWM}$ all are in the high level in the same time. In other words, the brown-out detection circuit 20 disables the brown-out signal $S_{OL}$ when the saw signal $V_{OSC}$ is higher than the first signal $V_{T1}$, the current signal $V_{CS}$ is lower than the second signal $V_{T2}$, and the switching signal $V_{PWM}$ is in the high level. The delay signal $S_{DELAY}$ is disabled after the brown-out signal $S_{OL}$ is disabled.

Accordingly, in a switching period, the output terminal of the first logic circuit 230 generates the brown-out signal $S_{OL}$ that the brown-out signal $S_{OL}$ is in the high level and the low level alternately. The output terminal of the second logic circuit 240 generates the delay signal $S_{DELAY}$ that the delay signal $S_{DELAY}$ is also in the high level and the low level alternately due to the second logic circuit 240 is the AND gate in accordance with one embodiment of the present invention. The delay circuit 18 doesn't output the disabling signal $S_{OFF}$ that is in the low level after the delay circuit 18 receives the delay signal $S_{DELAY}$ being in the low level and the high level alternately. In other words, the delay signal $S_{DELAY}$ being in the high level drives the delay circuit 18 to count, but the delay circuit 18 stops counting before the delay time $T_D$ is reached due to the delay signal $S_{DELAY}$ being in the low level disables the delay circuit 18. Hence, it is no chance that the delay circuit 18 outputs the disabling signal $S_{OFF}$ being in the low level. So, the disabling signal $S_{OFF}$ outputted to the signal generation circuit 10 is kept in the high level. It is to say, the signal generation circuit 10 will not latch the switching signal $V_{PWM}$ when the pull-high signal $S_{PH}$ being in the high level is caused in some conditions which lead to the input voltage $V_{IN}$ being more low.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A power supply with open-loop protection, comprising:
    a transformer, receiving an input voltage;
    a switch, coupled to the transformer for switching the transformer;
    a signal generation circuit, generating a switching signal to control the switch for switching;
    a feedback detection circuit, generating a pull-high signal in response to a feedback signal of the power supply;
    a brown-out detection circuit, generating a delay signal in response to the pull-high signal and the input voltage; and
    a delay circuit, coupled to count a delay time in response to the delay signal for generating a disabling signal, the disabling signal coupled to the signal generation circuit to latch the switching signal.

2. The power supply as claimed in claim 1, wherein the delay circuit counts the delay time in response to the delay signal for generating the disabling signal to latch the switching signal when the pull-high signal is in a high level and the input voltage being higher than a second signal is detected by the brown-out detection circuit.

3. The power supply as claimed in claim 1, wherein the brown-out detection circuit controls the delay circuit disabling to count the delay time and the switching signal is not latched by the disabling signal when the input voltage being lower than a second signal is detected by the brown-out detection circuit.

4. The power supply as claimed in claim 1, further comprising:
    a oscillator, generating a pulse signal, the signal generation circuit generating the switching signal in response to the pulse signal.

5. The power supply as claimed in claim 1, further comprising:
    a driving circuit, generating a reset signal to disable the switching signal in response to a current signal of the power supply, a power limit signal and the feedback signal.

6. The power supply as claimed in claim 1, wherein the feedback detection circuit generates the pull-high signal in response to the feedback signal and a threshold signal.

7. The power supply as claimed in claim 1, wherein the brown-out detection circuit generates a brown-out signal in response to a saw signal, a current signal and the switching signal, and generates the delay signal in response to the brown-out signal and the pull-high signal, in which the current signal is correlated to the input voltage.

8. The power supply as claimed in claim 7, wherein the brown-out detection circuit disables the brown-out signal for controlling the delay circuit to stop counting the delay time and the switching signal is not latched when the saw signal is higher than a first signal, the current signal is lower than a second signal and the switching signal is in a high level.

9. The power supply as claimed in claim 7, wherein the brown-out detection circuit enables the delay signal for controlling the delay circuit to count the delay time for generating the disabling signal to latch the switching signal when the pull-high signal is in a high level as well as the saw signal is lower than a first signal, the current signal is higher than a second signal or the switching signal is in a low level.

10. The power supply as claimed in claim 7, wherein the brown-out detection circuit further comprises:
    a duty comparator, comparing the saw signal with a first signal for generating a duty signal;
    a input comparator, comparing the current signal and a second signal for generating an input signal; and
    a first logic circuit, generating the brown-out signal in response to the duty signal, the input signal and the switching signal.

11. The power supply as claimed in claim 10, further comprising:
    a second logic circuit, generating the disabling signal in response to the pull-high signal and the brown-out signal, the delay circuit counting the delay time in response to the delay signal for generating the disabling signal.

* * * * *